United States Patent [19]

Simone et al.

[11] Patent Number: 4,510,039

[45] Date of Patent: Apr. 9, 1985

[54] PROCESS FOR THE LIQUID PHASE HYDROGENATION OF COAL

[75] Inventors: Prégermain Simone, Paris; Charcosset Henri; Andrés Michele, both of Villeurbanne, all of France

[73] Assignees: Charbonnages de France; Gaz de France, both of Paris, France

[21] Appl. No.: 485,247

[22] Filed: Apr. 15, 1983

[30] Foreign Application Priority Data

Apr. 15, 1982 [FR] France ................. 82 06492

[51] Int. Cl.³ ............................... C10G 1/06
[52] U.S. Cl. ..................... 208/10
[58] Field of Search ......................... 208/10

[56] References Cited

U.S. PATENT DOCUMENTS

| | | | |
|---|---|---|---|
| 2,075,101 | 3/1937 | Dreyfus | 208/10 |
| 2,464,271 | 3/1949 | Storch et al. | 208/10 |
| 3,700,584 | 10/1972 | Johanson et al. | 208/10 |
| 3,775,286 | 11/1973 | Mukherjee et al. | 208/10 |
| 4,148,709 | 4/1979 | Sze | 208/10 |
| 4,176,041 | 11/1979 | Mori et al. | 208/10 |
| 4,250,015 | 2/1981 | Yang et al. | 208/10 |

FOREIGN PATENT DOCUMENTS

| | | | |
|---|---|---|---|
| 0009615 | 10/1932 | Australia | 208/10 |
| 0559396 | 9/1932 | Fed. Rep. of Germany | 208/10 |
| 0719536 | 4/1942 | Fed. Rep. of Germany | 208/10 |
| 55-112291 | 8/1980 | Japan | 208/10 |

OTHER PUBLICATIONS

Formation of Ultrafine $Fe_2O_3$ Aerosols From a Flame Supported Reaction; Vergnon et al., Int. Eng. Chem. Prod. Res. Div. 1980, pp. 147–151.

Primary Examiner—William G. Wright
Attorney, Agent, or Firm—Finnegan, Henderson, Farabow, Garrett & Dunner

[57] ABSTRACT

A process for hydrogenating coal in the liquid phase in the presence of a catalyst comprising an iron oxide obtained by decomposition of an iron compound in a flame, in particular in the flame of a torch. A co-catalyst, such as $SnO_2$, also prepared by decomposition of a metal compound in a flame, may be added to the iron oxide.

12 Claims, No Drawings

PROCESS FOR THE LIQUID PHASE HYDROGENATION OF COAL

This invention relates to a process for the liquid phase hydrogenation of coal.

BACKGROUND OF THE INVENTION

The liquid phase hydrogenation of coal can be carried out by mixing coal with a solvent which acts as a hydrogen donor and then heating the mixture to a temperature between about 400° C. and 500° C. under hydrogen pressure, in the presence of a catalyst.

Numerous catalysts have been proposed for this reaction. Among these are catalysts based on noble metals (for example cobalt or nickel together with molybdenum or tin) that have the advantage of being relatively active. These catalysts are, however, expensive. Moreover, it is difficult to recover them from the hydrogenation residue.

Iron catalysts have been proposed which have the advantage of being less expensive than the noble metal catalysts. These iron catalysts are, unfortunately, less active than other catalysts, and they must be used in large amounts in the hydrogenation mixture. This results in many disadvantages, such as the danger of blockage of the reactor and of the pipelines surrounding the reactor, an increase in the corrosion of the valves in the reaction system, and an increase in the amount of material to be handled and to be heated.

SUMMARY OF THE INVENTION

An object of the present invention is to provide a process for the hydrogenation of coal that uses a catalyst that is not as expensive as catalysts using noble metals.

An additional object of the present invention is to provide a process for the hydrogenation of coal that uses an iron-based catalyst without the above described disadvantages.

Additional objects and advantages of the invention will set forth in part in the description that follows, and in part will be obvious from the description or may be learned by practice of the invention. The objects and advantages of the invention may be realized and attained by means of the procedures and combinations particularly pointed out in the appended claims.

To achieve the foregoing objects and in accordance with the purpose of the invention, as embodied and broadly described herein, the invention comprises a process for the hydrogenation of coal in the liquid phase, comprising the step of hydrogenating the coal in the presence of a catalyst comprising an iron oxide obtained by decomposition of an iron compound in a flame.

DESCRIPTION OF THE PREFERRED EMBODIMENTS

Reference will now be made to the presently preferred embodiments of the invention.

The hydrogenation process of the present invention eliminates the disadvantages of previous iron and noble metal catalysts by employing an iron catalyst that is much more active than earlier catalysts and can consequently be used in much smaller amounts in the mixture to be hydrogenated. Unlike certain earlier processes, the iron oxide of the present invention does not contain a basic constituent.

The process of the invention comprises hydrogenating the coal in the presence of a catalyst comprising an iron oxide obtained by decomposition of an iron compound in a flame.

The catalyst is obtained by introducing an iron compound, for example a ferric chloride, in the vapor state into the flame of a torch. Under these conditions, iron oxide particles having a size of about 10 to 200 nanometers are formed. Such a process for obtaining very fine particles of iron oxide is already known. The process is described in particular in an article by Vergnon and Landoulsi, "Formation of Ultrafine $Fe_2O_3$ Aerosols from a Flame Supported Reaction," *Industrial Engineering Chemistry, Product Research and Development*, No. 19, pp. 147–151, (1980).

The iron oxide particles obtained by decomposition of ferric chloride in a flame may be advantageously subjected to supplementary calcination, for example by heating to about 300° C., so as to reduce or remove residual traces of chlorine which may have an adverse effect on the activity of the catalyst.

The activity of the catalyst of the present invention may also be improved by adding a small amount of a co-catalyst, preferably an oxide, such as $SnO_2$, also prepared by decomposition of a compound of the co-catalyst metal in the flame of a torch. Thus, an $Fe_2O_3$-$SnO_2$ catalyst mixture is advantageously prepared by decomposing a mixture of ferric chloride and tin chloride. The $SnO_2$ content of the catalyst is advantageously less than 15 weight percent and preferably between 0.5 and 5 weight percent of the catalyst mixture. These mixed catalysts can also be subjected to subsequent treatment to reduce or remove traces of chlorine, for example by calcination.

The hydrogenation of the coal is preferably carried out at a temperature of between about 400° C. and 500° C., in the presence of a hydrogen-donor solvent which can in particular be recycled from the hydrogenation products. The hydrogen pressure in the hydrogenation reactor can vary within wide limits that depend on the nature of the coal used. The pressure may be from a few bars to several hundred bars. The most satisfactory results are obtained at between 100 bars and 300 bars. The proportion of catalyst to coal can vary between about 0.1 weight percent and 10 weight percent and is preferably between 0.2 and 1 weight percent.

The purpose of the following examples is to illustrate some embodiments of the present invention without implying a limitation.

EXAMPLES 1 AND 2 (COMPARATIVE EXAMPLES) AND 3

Hydrogenation tests were carried out on a Freyming flame-burning soft coal from Lorraine, containing 35% volatiles and 7.4% ash. The solvent used was technical-grade tetralin (96.3% tetralin, 1.7% cis-decalin and 0.4% trans-decalin).

An 830 ml reactor autoclave had the following compounds introduced:

200 g of tetralin 100 g of dry coal of particle size of less than 80 microns, the catalysts to be used 1 g of carbon disulfide (intended to ensure sulfurization of the catalyst), and about 7 g of hydrogen (150 bar at ambient temperature).

In Example 1, (a comparative example) no catalyst was used.

In Example 2, 10 g of a commercial catalyst comtaining 3.3% NiO and 14.4% $MoO_3$ on alumina were used.

In Example 3, 0.5 g of $Fe_2O_3$ obtained by decomposition of $FeCl_3$ in the flame of a torch were used (particle size: 10 to 200 nanometers).

The reaction temperature was 450° C., the residence time of the reactants at this temperature was 3 h, and the rate of temperature rise was 200° C./h.

At the end of each experiment, the products leaving the autoclave were treated as follows:

the gases were collected in a balloon, their volume was measured, and their composition determined to determine the amount of hydrogen consumed, in grams per 100 g of coal; and the solid-liquid mixture was fractionated by filtration and distillation.

Ultimately, the activity of the catalysts was estimated from the yields of reaction products, expressed as a percentage by weight relative to the coal introduced, the products being classified as follows: distillation residue (tar), excess liquid (after subtracting the starting solvent), insoluble matter (inorganic matter and organic matter), $CO_2+CO$, $C_1$ to $C_4$ hydrocarbons, and aqueous phase.

It appears that the consumption of hydrogen depends on the hydrogenating function of the catalyst while the amount of distillation residue depends on the cracking function of the catalyst. The value of the treatment resides above all in reducing the amount of distillation residue. This residue is difficult to utilize.

The test results are shown in Table I.

TABLE I

| Example | 1 | 2 | 3 |
|---|---|---|---|
| Catalyst (Nature) | None | $NiO-MoO_3/Al_2O_3$ | Torch produced $Fe_2O_3$ |
| (% relative to coal) | 0 | 10 | 0.5 |
| $H_2$ consumed | 4.05 | 5.15 | 4.95 |
| Distillation residue | 24.8 | 22.5 | 20.75 |
| Excess liquid | 47.4 | 51.6 | 54.1 |
| Insoluble matter | 16.75 | 16.9 | 16.4 |
| $CO_2 + CO$ | 1.4 | 0.3 | 0.7 |
| $C_1 + C_4$ | 7.15 | 5.85 | 6.4 |
| $H_2O$ | 6.55 | 8.0 | 6.6 |

The $Fe_2O_3$ catalyst of the invention provides a much lower proportion of distillation residue than the commercial, nickel-molybdenum, catalyst, in spite of the large amount of the latter used.

EXAMPLES 4 AND 5

To show the value of calcining the catalyst, $Fe_2O_3$ catalyst of the invention, obtained by decomposition of $FeCl_3$ in the flame of a torch and containing 1.8% chlorine (Example 4), and a sample of the same batch, after calcination at 300° C. (Example 5) and containing less than 0.2% of chlorine, were tested.

The tests were carried out as in Example 3, with 0.5% catalyst relative to the coal.

The results obtained are shown in Table II below.

EXAMPLE 6 AND 7

A catalyst containing 96.55% $Fe_2O_3$ and 3.45% $SnO_2$ was prepared by decomposing a mixture of ferric chloride and tin chloride in the flame of a torch.

This catalyst was employed in a coal hydrogenation test in Example 6, carried out as in Example 3. The proportion of catalyst relative to the coal was 0.5%.

The test in Example 7 was carried out with the same catalyst, calcined at 300° C.

The results obtained are shown in Table III below.

TABLE II

| Example | 4 | 5 |
|---|---|---|
| Catalyst | Torch-produced $Fe_2O_3$ (as obtained) | Torch-produced $Fe_2O_3$ (after calcination) |
| $H_2$ consumed | 4.8 | 4.85 |
| Distillation residue | 23.0 | 19.7 |
| Excess liquid | 52.7 | 56.2 |
| Insoluble matter | 15.6 | 16.8 |
| $CO_2 + CO$ | 0.8 | 0.7 |
| $C_1$ to $C_4$ | 6.3 | 6.0 |
| $H_2O$ | 6.4 | 5.45 |

TABLE III

| Example | 6 | 7 |
|---|---|---|
| Catalyst | $Fe_2O_3-SnO_2$ (as obtained) | $Fe_2O_3-SnO_2$ (after calcination) |
| $H_2$ consumed | 4.8 | 4.5 |
| Distillation residue | 18.9 | 18.9 |
| Excess liquid | 57.5 | 56.1 |
| Insoluble matter | 15.5 | 16.4 |
| $CO_2 + CO$ | 0.6 | 0.8 |
| $C_1$ to $C_4$ | 5.9 | 6.6 |
| $H_2O$ | 6.4 | 5.7 |

An improvement compared to the tests of Examples 4 and 5 (in the sense of a smaller amount of distillation residue) is shown.

It will be apparent to those skilled in the art that various modifications and alterations could be made in the process of the invention without departing from the scope or spirit of the invention.

What is claimed is:

1. A process for the hydrogenation of coal in the liquid phase, comprising the step of hydrogenating said coal in the presence of a catalyst consisting essentially of an iron oxide obtained by decomposition of a vaporized iron compound in the flame of a torch.

2. The process of claim 1, wherein said catalyst is prepared by decomposition of vaporized ferric chloride in the flame of a torch.

3. The process of claim 1, wherein said catalyst is treated in order to reduce the chlorine content of said catalyst.

4. The process of claim 1, wherein said catalyst further comprises a co-catalyst.

5. The process of claim 4, wherein said co-catalyst is tin dioxide, $SnO_2$.

6. The process of claim 5, wherein the content of said co-catalyst in the catalyst mixture is less than 15 weight percent.

7. The process of claim 6, wherein the content of said co-catalyst in the catalyst mixture is between 0.5 and 5 weight percent.

8. The process of claim 5, wherein said catalyst is prepared by decomposing a vaporized mixture of ferric chloride and tin chloride in the flame of a torch.

9. The process of claim 8, wherein said catalyst is treated to reduce the chlorine content of said catalyst.

10. The process of claim 3, wherein the treatment to reduce the chlorine content of said catalyst includes calcination.

11. The process of claim 9, wherein the treatment to reduce the chlorine content of said catalyst includes calcination.

12. The process of claim 1 wherein said iron oxide is in the form of particles having a size of about 10-200 namometers.

* * * * *

UNITED STATES PATENT AND TRADEMARK OFFICE
CERTIFICATE OF CORRECTION

PATENT NO. : 4,510,039
DATED : April 9, 1985
INVENTOR(S) : SIMONE PREGERMAIN ET AL.

It is certified that error appears in the above-identified patent and that said Letters Patent is hereby corrected as shown below:

Page 1, line 2, change "Simone et al." to --Pregermain et al.-- after "[75] Inventors:" change the names of the inventors to --Simone Pregermain; Henri Charcosset and Michele Andres--, after "[73] Assignees:" add the following additional assignees --Institut Francais Du Petrole, Rueil Malmaison, France, and Centre National de la Recherche Scientifique (CNRS), Paris, France--

Signed and Sealed this

Twentieth Day of August 1985

[SEAL]

*Attest:*

DONALD J. QUIGG

*Attesting Officer*   *Acting Commissioner of Patents and Trademarks*